US008371946B2

(12) United States Patent
Rodriguez et al.

(10) Patent No.: US 8,371,946 B2
(45) Date of Patent: Feb. 12, 2013

(54) DISPLAY MOUNTING ASSEMBLIES AND GAMING TERMINALS WITH MOUNTING ASSEMBLIES FOR DISPLAY DEVICES

(75) Inventors: Frank E. Rodriguez, Chicago, IL (US); Scott Minch, Wheeling, IL (US); Jacob C. Greenberg, Elgin, IL (US); Jeremy K. Gill, Chicago, IL (US); Edward J. Redd, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/027,389

(22) Filed: Feb. 15, 2011

(65) Prior Publication Data

US 2012/0208645 A1 Aug. 16, 2012

(51) Int. Cl.

*A63F 9/24* (2006.01)
*A63F 13/00* (2006.01)
*G06F 17/00* (2006.01)
*G06F 19/00* (2006.01)

(52) U.S. Cl. .................. 463/46; 463/3; 463/11; 463/20; 463/31; 273/138; 273/143; 273/292

(58) Field of Classification Search .................. 273/143, 273/138, 292; 463/3, 11, 20, 31, 46
See application file for complete search history.

(56) References Cited

U.S. PATENT DOCUMENTS

| | | | | |
|---|---|---|---|---|
| 4,718,672 | A | 1/1988 | Okada | |
| 6,135,884 | A * | 10/2000 | Hedrick et al. | 463/20 |
| 6,164,645 | A | 12/2000 | Weiss | |
| 6,287,194 | B1 | 9/2001 | Okada et al. | |
| 6,475,087 | B1 | 11/2002 | Cole | |
| 6,497,617 | B1 | 12/2002 | Yoshida | |
| 6,623,006 | B2 | 9/2003 | Weiss | |
| 7,267,613 | B2 * | 9/2007 | Cole | 463/20 |
| 7,387,572 | B2 | 6/2008 | Hanchar | |
| 7,513,830 | B2 | 4/2009 | Hajder et al. | |
| 7,540,806 | B2 | 6/2009 | Tastad | |
| 7,594,852 | B2 | 9/2009 | Rasmussen | |
| 7,611,408 | B2 | 11/2009 | Martin et al. | |
| 7,806,770 | B2 | 10/2010 | Taxon | |
| 2004/0248648 | A1 * | 12/2004 | Rothschild et al. | 463/31 |
| 2005/0051964 | A1 * | 3/2005 | Nordman | 273/292 |
| 2006/0277805 | A1 | 12/2006 | Kopera et al. | |
| 2008/0113821 | A1 * | 5/2008 | Beadell et al. | 463/46 |
| 2008/0265503 | A1 * | 10/2008 | Wudtke | 273/138.2 |
| 2009/0264194 | A1 | 10/2009 | Kompella | |
| 2009/0325692 | A1 | 12/2009 | Klostermann et al. | |

FOREIGN PATENT DOCUMENTS

| | | |
|---|---|---|
| WO | 03 028829 A1 | 4/2003 |

* cited by examiner

*Primary Examiner* — Omkar Deodhar
*Assistant Examiner* — Adetokunbo Torimiro
(74) *Attorney, Agent, or Firm* — Nixon Peabody LLP

(57) ABSTRACT

Gaming terminals, gaming systems, display device support assemblies, and methods of mounting a display device to a gaming terminal are presented herein. A gaming terminal for playing a wagering game is disclosed. The gaming terminal includes a cabinet, an input device for receiving wagers to play the wagering game, and a display device for displaying information related to the wagering game. The gaming terminal also includes a mounting assembly which affixes the display device proximate the top of the cabinet. The mounting assembly pivotably supports the display device such that a lateral side of the display device can be selectively swung from a first position over the top of the cabinet to a second position over a front of the cabinet where the display device is removable from the cabinet.

24 Claims, 13 Drawing Sheets

DISPLAY MOUNTING ASSEMBLIES AND GAMING TERMINALS WITH MOUNTING ASSEMBLIES FOR DISPLAY DEVICES

COPYRIGHT

A portion of the disclosure of this patent document contains materials subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present disclosure relates generally to wagering game machines and gaming systems, and more particularly to support assemblies for mounting and dismounting display devices from gaming terminals and gaming systems.

BACKGROUND

Gaming machines, such as slot machines, video poker machines, and the like, have been a cornerstone of the gaming industry for several years. Generally, the popularity of such machines with players is dependent on the likelihood (or perceived likelihood) of winning money at the machine, as well as the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators therefore strive to employ the most entertaining and exciting machines, features, and enhancements available because such machines, features, and enhancements attract frequent play and, hence, increase profitability to the operator.

Many gaming machines include a variety of visual attractions and displays, such as models, signs, and other forms of information. These items typically include fixed permanently-printed glass, video displays, artwork, models, and/or marquees. In many gaming regions, industry regulations in fact require each gaming terminal to include top-box mounted lighting and signage that indicate, for example, the class of machine, when the machine is of out of funds, when the machine is malfunctioning, etc. Historically, each gaming machine was limited to a single game with a dedicated top box display and top-box mounted flat-screen display or marquee assembly. To alter game offerings, casino operators or contracted technicians were therefore required to replace the entire gaming machine or the entire top-box mounted display and/or marquee assembly. The replacement process is costly, time consuming, and counter-productive to maintaining pace with the continuously changing gambling industry.

In response, many gaming machine manufacturers, especially those that produce video-based gaming machines, have developed a basic gaming terminal (e.g., one that is universal to a variety of game offerings) that allows multiple games to be presented on the same machine, allowing easy conversion to a new game. For instance, if a casino operator decides that a certain video reel slot game, using a particular molded marquee, has reached the end of its useful playing life on the casino floor, the operator contacts the manufacturer and requests a conversion of the gaming machine to a newer, perhaps more popular game. The conversion of the video-based wagering game is a simple task, merely requiring a change of software and perhaps surface artwork.

In converting the gaming machine to a new game, previously employed marquees and display devices typically require removal and modification or replacement. There are also instances where a cabinet mounted display device simply needs to be removed for replacement or repair. This process can be time-consuming, cumbersome, expensive, and can result in damage to the display device or the gaming terminal. In many cases, replacing a cabinet-mounted display or marquee typically necessitates at least two service technicians. Time and labor costs are compounded by the complexity in electrically disconnecting and physically dismounting and managing the bulk and weight of the assembly, and subsequently mounting and connecting the new assembly. Often times, the technician is required to run electrical cabling from the assembly, down through an opening in the crown and through the top box to the base cabinet. This often requires opening and dismantling a significant portion of the gaming terminal to complete the electrical connections. There is therefore a need to develop improved mounting interfaces and gaming machines with improved mounting interfaces for facilitating and simplifying the removal and replacement process of cabinet-mounted displays and marquees.

SUMMARY

According to aspects of the present disclosure, a gaming terminal for playing a wagering game is featured. The gaming terminal includes a cabinet, an input device, a display device, and a mounting assembly. The input device is configured to receive a wager to play the wagering game. The display device is configured to display information related to the wagering game. The mounting assembly affixes the display device proximate to a top of the cabinet. The mounting assembly pivotably supports the display device such that one side of the display device can be selectively swung from a first position over the top of the cabinet to a second position over a front of the cabinet where the display device is removable from the cabinet.

According to other aspects of the present disclosure, a gaming system is presented. The gaming system includes at least one input device, at least one processor, at least one memory, a cabinet, and at least one display. The gaming system also includes a mounting assembly that affixes the at least one display to a top of the cabinet. The mounting assembly pivotably supports the display such that one side thereof can be selectively swung from a first position over the top of the cabinet to a second position over a front of the cabinet where the display is removable from the cabinet.

According to another aspect of the present disclosure, a gaming machine for displaying an outcome of a wagering game is disclosed. The outcome is randomly determined from a plurality of wagering game outcomes. The gaming machine includes an input device configured to receive a wager to play the wagering game, a cabinet, and first and second display devices mounted to the cabinet. At least one of the display devices is configured to display the wagering game outcome. A mounting assembly pivotably mounts the second display device to the top of the cabinet. The mounting assembly is repositionable between a first position, whereat the second display device is functionally oriented for normal operation thereof, and a second position, whereat a center of gravity of the second display device is relocated to facilitate removal thereof from the cabinet.

According to yet another aspect of the present disclosure, a support assembly is presented for removably mounting a display device to a gaming terminal. The support assembly includes a first swing pole configured to protrude from a first side of the display device, and a second swing pole configured to protrude from a second side of the display device. A first sleeve is configured to protrude upwardly from a top portion of the cabinet. The first sleeve removably receives therein the first swing pole. The second sleeve is configured to protrude upwardly from the top portion of the cabinet. The second sleeve removably receives therein the second swing pole. The first sleeve supports the display device such that the second lateral side of the display device can be selectively swung from a first position over the top of the cabinet to a second position over a front of the cabinet where the display device is removable from the cabinet.

According to even yet another aspect of the present disclosure, a method of mounting a display device over a top portion of a wagering game terminal is provided. The method includes: seating the first lateral side of the display device in a first sleeve protruding from the top portion of the wagering game terminal; swinging the second lateral side of the display device from a forward-extending position over a front portion of the cabinet to a functional position over the top portion of the cabinet, the first sleeve carrying the weight of the display device when swung between the forward-extending and functional positions; and attaching the second lateral side of the display device to a second sleeve protruding from the top portion of the wagering game terminal.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and best modes for carrying out the present invention when taken in connection with the accompanying drawings and the appended claims.

Figure 1:
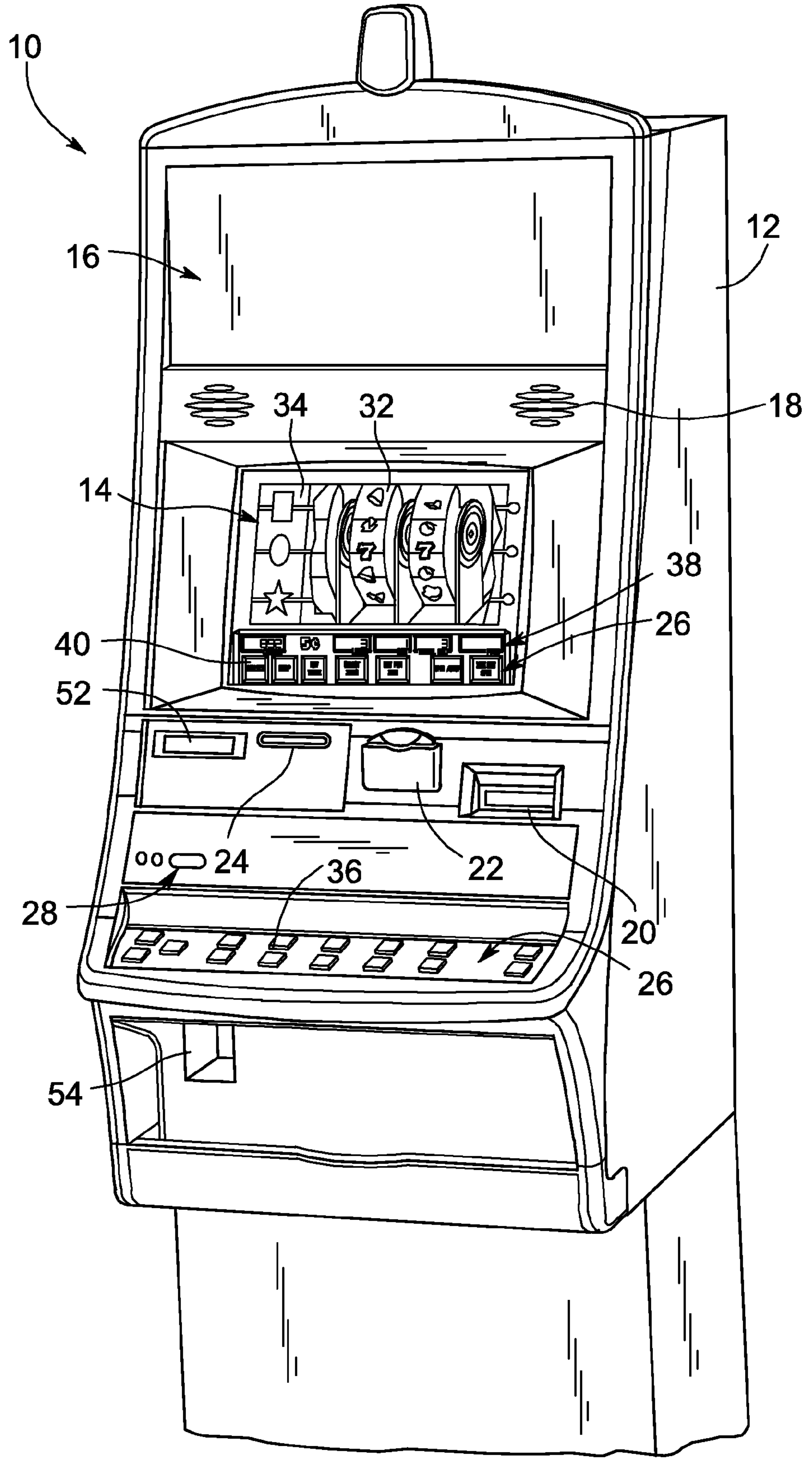
FIG. 1 is a perspective-view illustration of an exemplary free-standing gaming terminal according to aspects of the present disclosure.

While the aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there are shown in the drawings and will herein be described in detail representative embodiments with the understanding that the present disclosure is to be considered as an exemplification of the various aspects and principles of the invention, and is not intended to limit the broad aspect of the invention to the embodiments illustrated. To that extent, elements and limitations that are disclosed, for example, in the Abstract, Summary, and Detailed Description of the Embodiments sections, but not explicitly set forth in the claims, should not be incorporated into the claims, singly or collectively, by implication, inference or otherwise.

Referring to FIG. 1, there is shown a gaming terminal 10 similar to those used in gaming establishments, such as casinos. With regard to the present disclosure, the gaming terminal 10 may be any type of gaming terminal and may have varying structures and methods of operation. For example, in some aspects, the gaming terminal 10 can be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
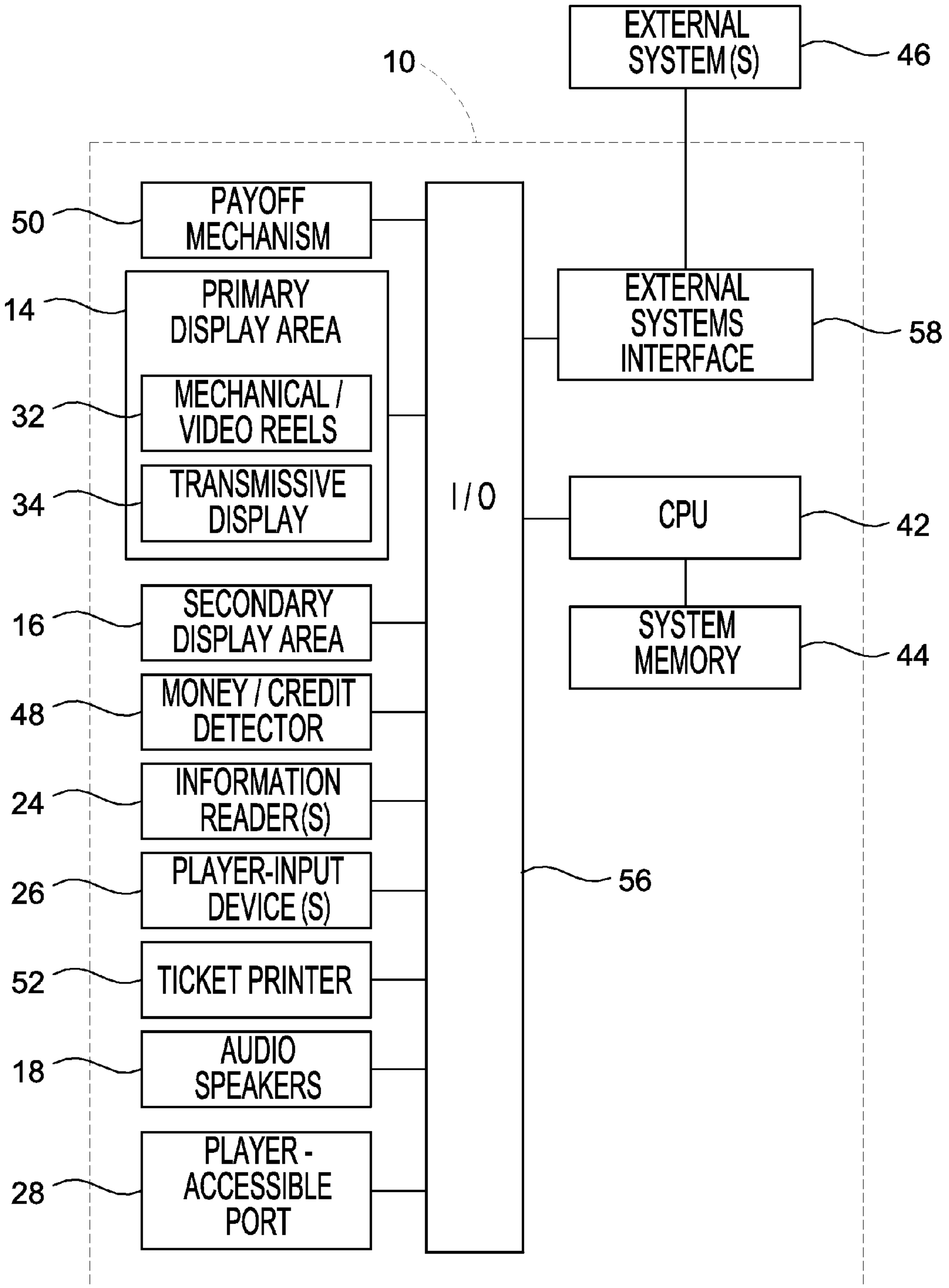
FIG. 2 is a schematic diagram of an exemplary gaming system according to aspects of the present disclosure.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account.

The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+front-side bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
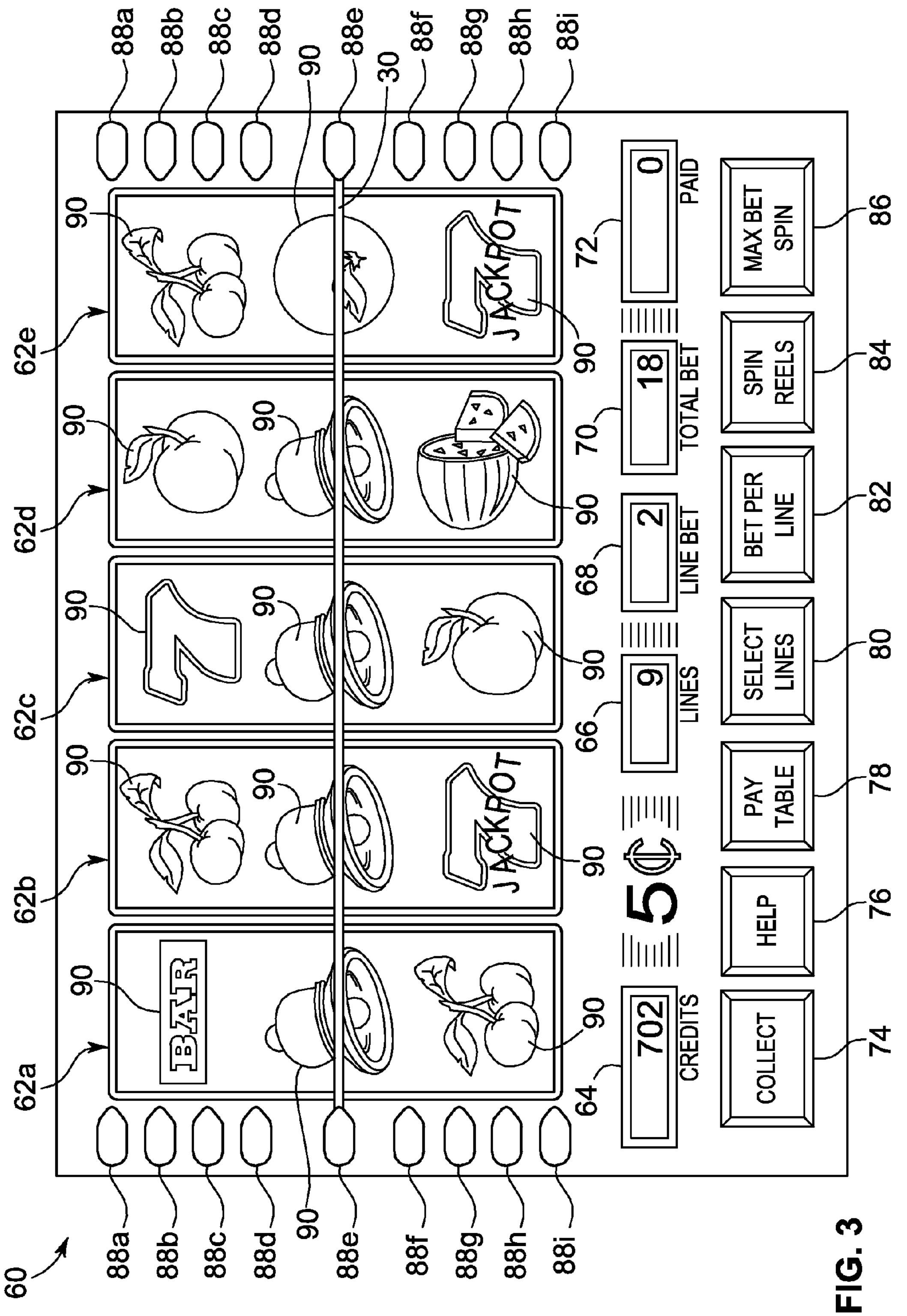
FIG. 3 is a screen shot of a basic-game screen from an exemplary wagering game that can be played, for example, on the gaming terminal of FIG. 1 or the gaming system of FIG. 2.

Referring now to FIG. 3, an image of a basic-game screen 60 adapted to be displayed on the primary display area 14 is illustrated, according to one embodiment of the present disclosure. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present disclosure does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present disclosure. Additionally, though an embodiment with five reels is shown in FIG. 3, different embodiments of the gaming terminal 10 comprise a greater or lesser number of reels in accordance with the present disclosure.

Figure 4:
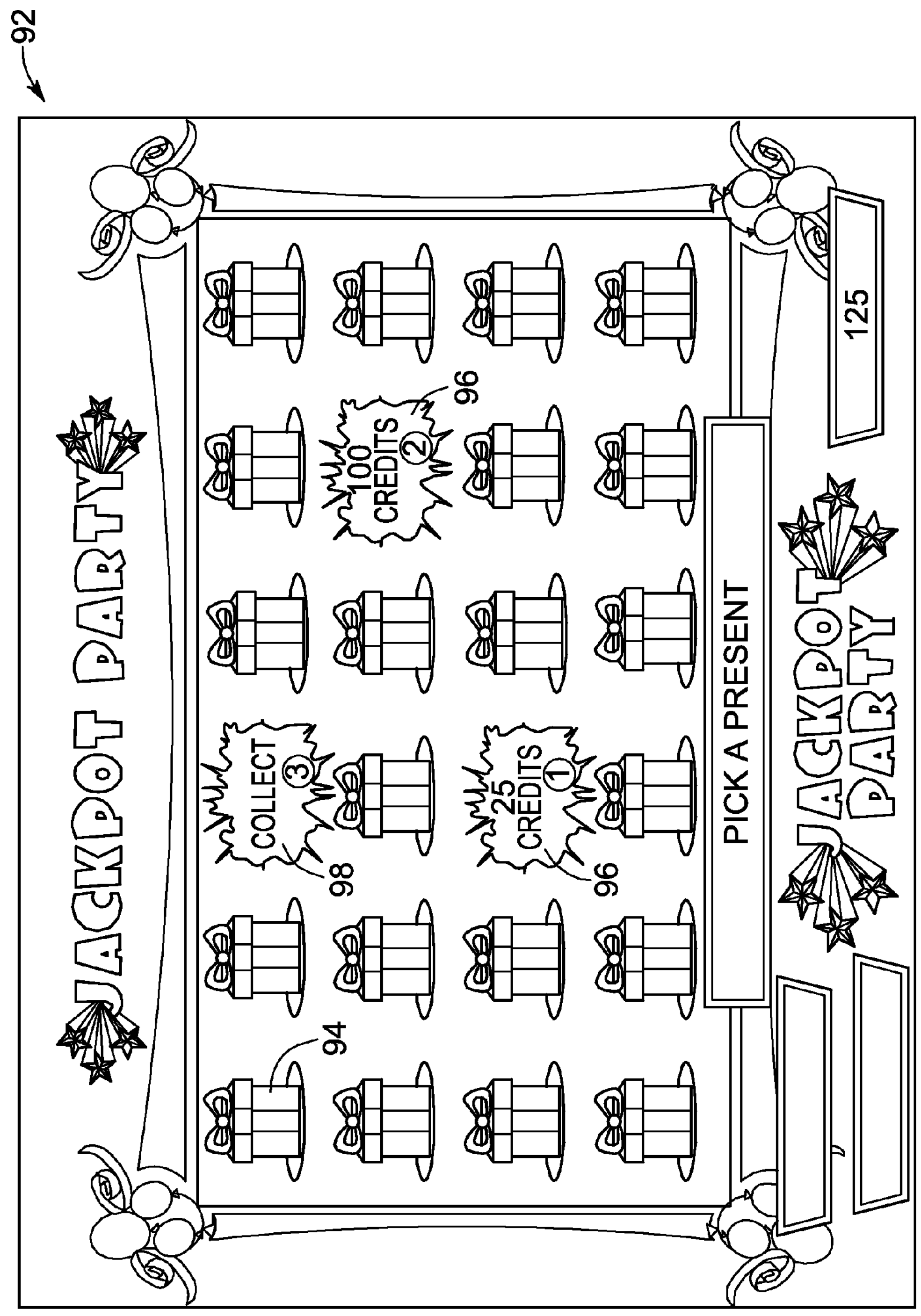
FIG. 4 is a screen shot of a secondary- or bonus-game screen from an exemplary wagering game that can be played, for example, on the gaming terminal of FIG. 1 or the gaming system of FIG. 2.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
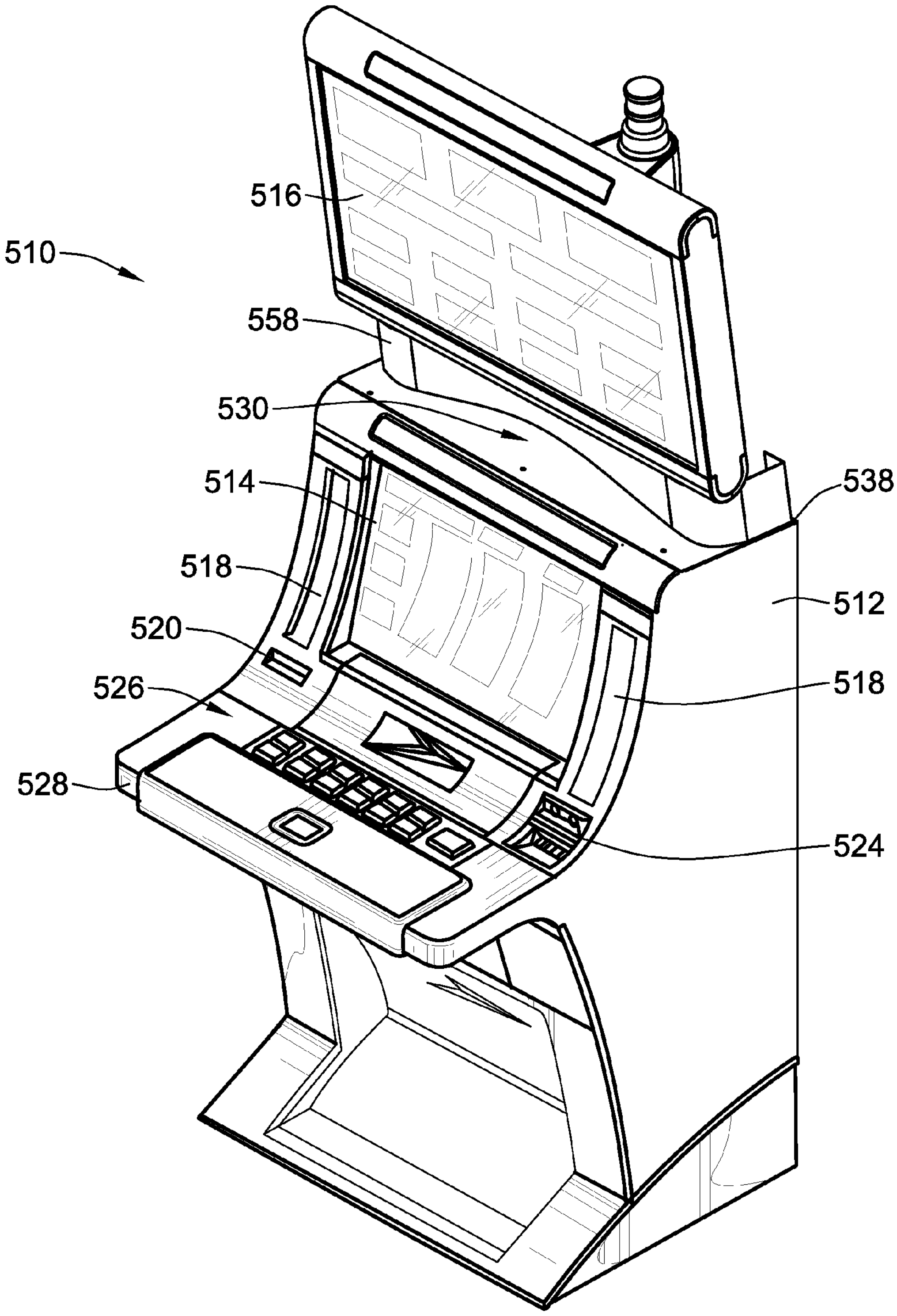
FIG. 5 is a perspective-view illustration of an exemplary display device mounted to a representative gaming terminal via a display mounting assembly in accordance with aspects of the present disclosure.

Referring now to FIG. 5, a perspective-view illustration of an exemplary gaming terminal, designated generally at 510, for playing one or more wagering games is shown in accordance with aspects of the present disclosure. Although differing in appearance, the gaming terminal 510 can be similar in function, operation and connectivity to the gaming terminal 10 discussed above with respect to FIGS. 1 and 2. For example, the gaming terminal 510 (also referred to herein as "wagering game machine" or "gaming machine") may be an electromechanical gaming terminal configured, for example, to play mechanical slots, or it may be an electronic gaming terminal configured, for example, to play a video casino game, such as keno, poker, slots, blackjack, roulette, etc. Markedly, the gaming terminal 510 is purely representative in nature, and presented solely for explanatory purposes. As such, the aspects of the present disclosure are in no way limited to the terminal configuration shown in FIG. 5.

The illustrated gaming terminal 510 comprises a cabinet 512 for housing and/or supporting a variety of operational componentry (e.g., CPU 42, memory 44, external systems interface 58, etc.). For output devices, the gaming terminal 510 includes a primary display area (or "first display device") 514, a secondary display area (or "second display device") 516, and one or more audio speakers 518. For input devices, the gaming terminal 510 may include a bill-receiving and validating device 520, a coin acceptor (not shown), one or more information readers 524, one or more player-input devices 526, and one or more player-accessible ports 528 (e.g., an audio output jack for headphones, a video headset jack, a wireless transmitter/receiver, etc.). While these typical components found in the gaming terminal 510 are described above, it should be understood that numerous additional/alternative peripheral devices and other elements may exist and may be used in any number of combinations to create various forms of a gaming terminal.

The first display device 514 may include, for example, a mechanical-reel display, a video display, other known display devices, and combinations thereof. The second display device 516 may display information associated with wagering games, non-wagering games, community games, progressives, advertisements, services, premium entertainment, text messaging, emails, alerts or announcements, broadcast information, subscription information, etc. Each of the display devices 514, 516 may take on the form of a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 510. In the illustrated embodiment, however, the second display device 516 includes a high-resolution LCD panel 515 (FIG. 6).

Figure 6:
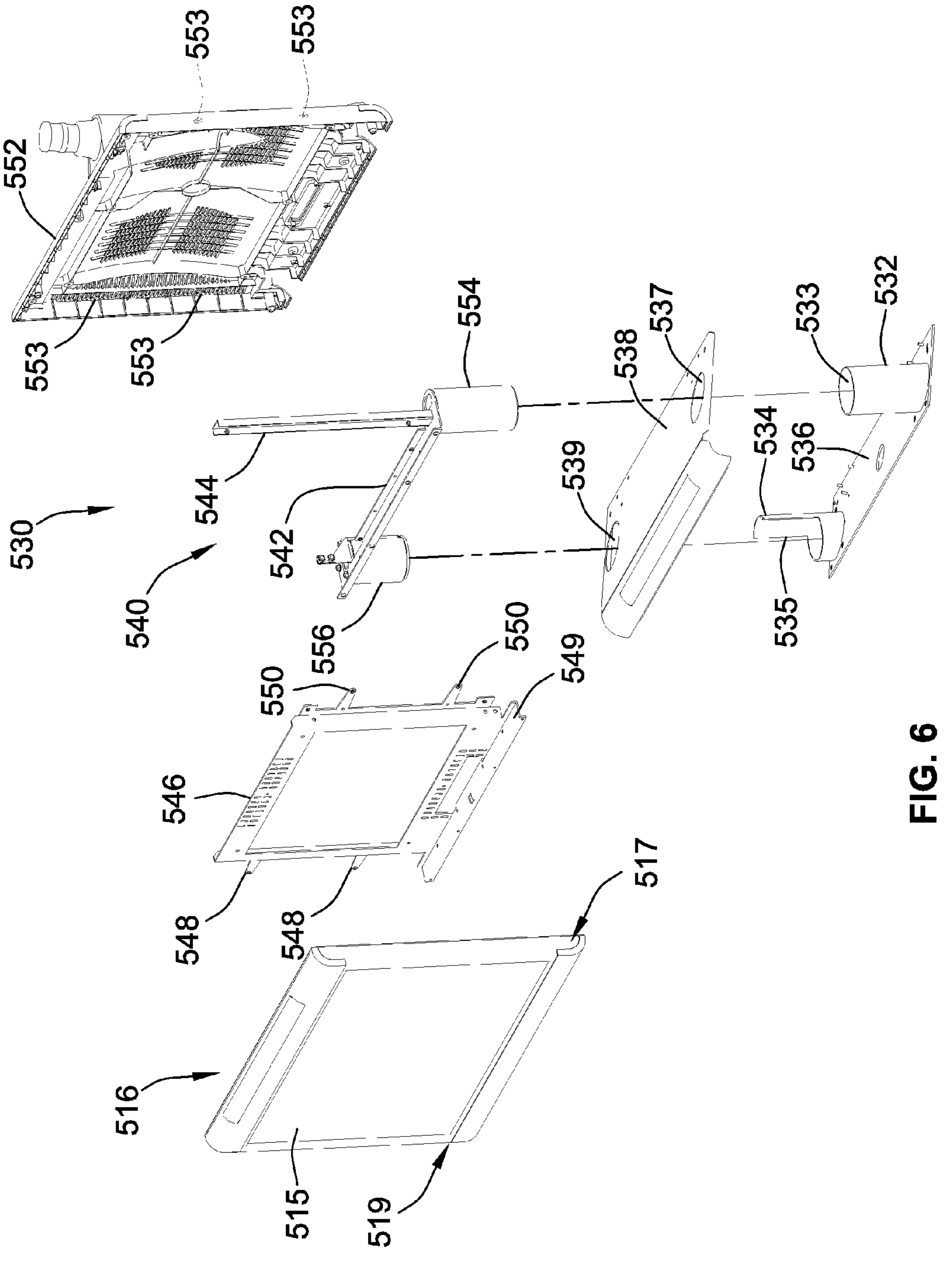
FIG. 6 is a partially exploded perspective-view illustration of the display mounting assembly of FIG. 5.

The second display device 516 is removably mounted to the top of the cabinet 512 (commonly known as the "crown") via a mounting assembly, which is indicated generally as 530 in FIGS. 5 and 6. The mounting assembly 530 (also referred to herein as "support assembly") includes two laterally offset attachment points, each of which removably attaches one of the laterally opposing sides 517 and 519 of the display device 516 proximate the top of the cabinet 512. In the embodiment of FIG. 6, for example, first and second support sleeves 532 and 534, respectively, protrude upwardly from an elongated, generally planar base plate 536. Both of the sleeves 532, 534 are generally cylindrical components that are rigidly attached (e.g., welded) at a bottom longitudinal end thereof to the flat upper surface of the base plate 536. The first support sleeve 532 has a first receiving opening 533 through the upper longitudinal end thereof. In contrast, a portion of the cylindrical periphery of the second support sleeve 534 is cut away or otherwise removed to define a second receiving opening 535 through a lateral side of the second support sleeve 534. When assembled to the gaming terminal 510, each support sleeve 532, 534 is fed through a complementary hole 537, 539 of a decorative top trim panel 538.

The base plate 536 is intended to be integrated to the top of the gaming terminal cabinet 512. In accordance with the illustrated embodiment, the base plate 536 is mechanically fastened or otherwise joined to the top of the cabinet 512, for example, via one or more rivets or threaded fasteners, such as screws or bolts (not shown in FIG. 6). In an alternate configuration, the base plate 536 is integrally formed with or is fabricated to replace the top panel 538 of the cabinet 512. Another optional alternative arrangement includes eliminating the use of a base plate altogether, and integrating the support sleeves 532, 534 directly to the cabinet 512. Note, the drawings presented herein are not to scale and are provided purely for explanatory purposes; as such, the individual and relative dimensions and orientations shown in the drawings are not to be considered limiting unless explicitly indicated otherwise in the claims.

The mounting assembly 530 exemplified in FIG. 6 also includes an L-shaped support arm, designated generally as 540. The L-shaped support arm 540 generally comprises an elongated, U-shaped cross-beam 542, which extends transversely with respect to the cabinet 512, and an elongated, U-shaped support beam 544, which protrudes generally orthogonally from a distal end of the cross-beam 542 extending longitudinally with respect to the cabinet 512. The L-shaped support arm 540 is configured to attach to the display device 516 and, in some embodiments, transmit the entire weight of the display device 516 to the cabinet 512 when the display device 516 is being mounted or dismounted. In the illustrated embodiment, for example, a generally flat, square-shaped backing plate 546 is interleaved between the LCD panel 515 and the support arm 540. In addition, the support arm 540 and backing plate 546 are sandwiched between the LCD panel 515 and a rear ventilation panel 552, which provides aeration for the display 516. A plurality of tabs 548 and 550, which extend transversely from opposing lateral sided of the backing plate 546, are rigidly fastened (e.g., via screws) to forward-facing segments (e.g., screw embossments 553) of the rear ventilation panel 552. Moreover, a forward face of an L-shaped shelf 549, which protrudes generally orthogonally from a lower edge of the backing plate 546, is rigidly fastened (e.g., via screws) to inside, rear-facing segments of the LCD panel 515 (not visible in the views provided). The backing plate 546, in turn, is rigidly fastened (e.g., via screws) to the cross-beam 542 and support beam 544.

Figure 7:
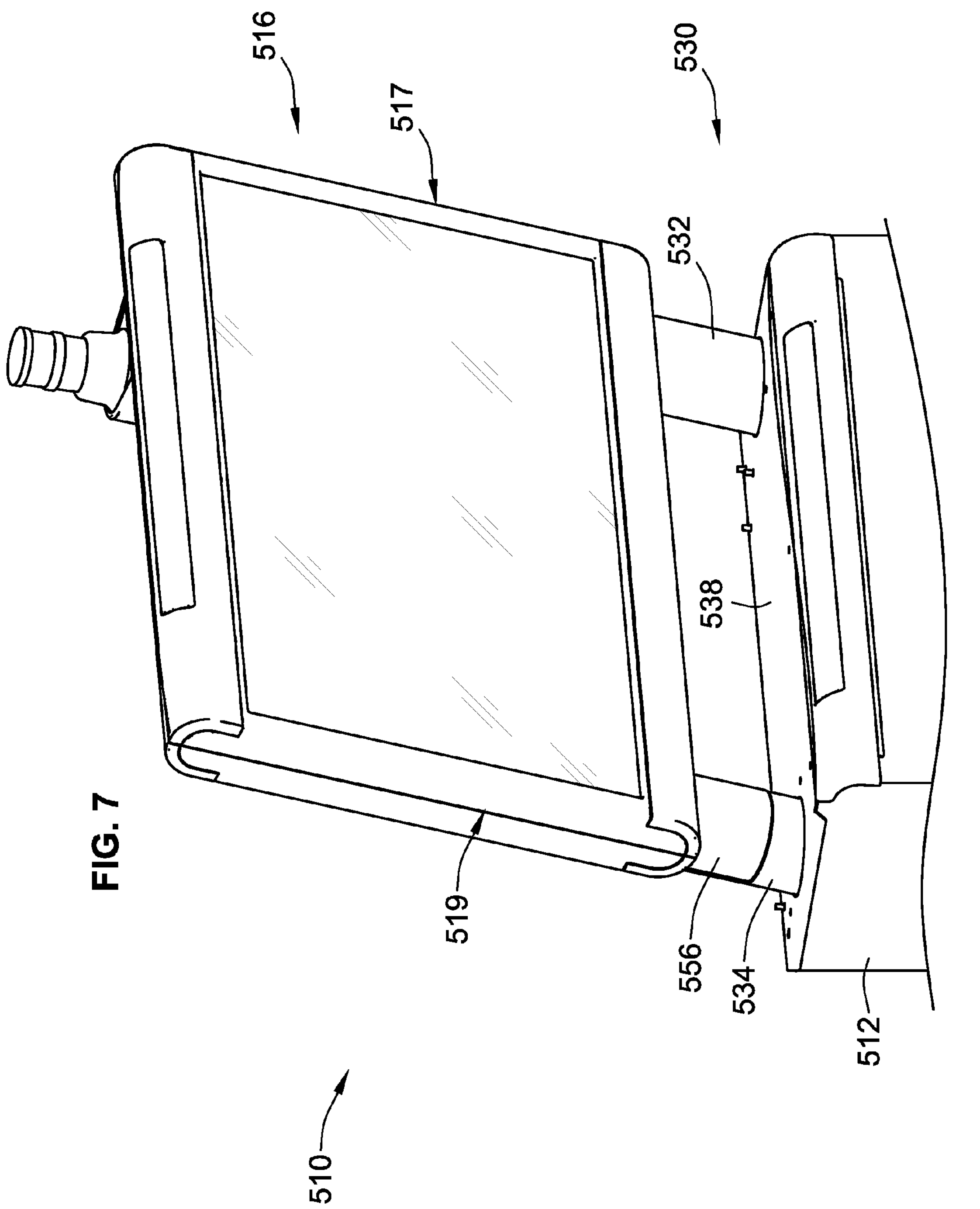
FIG. 7 is a perspective-view illustration of the display mounting assembly of FIG. 5 securing the display device in a representative functional position.
Figure 8:
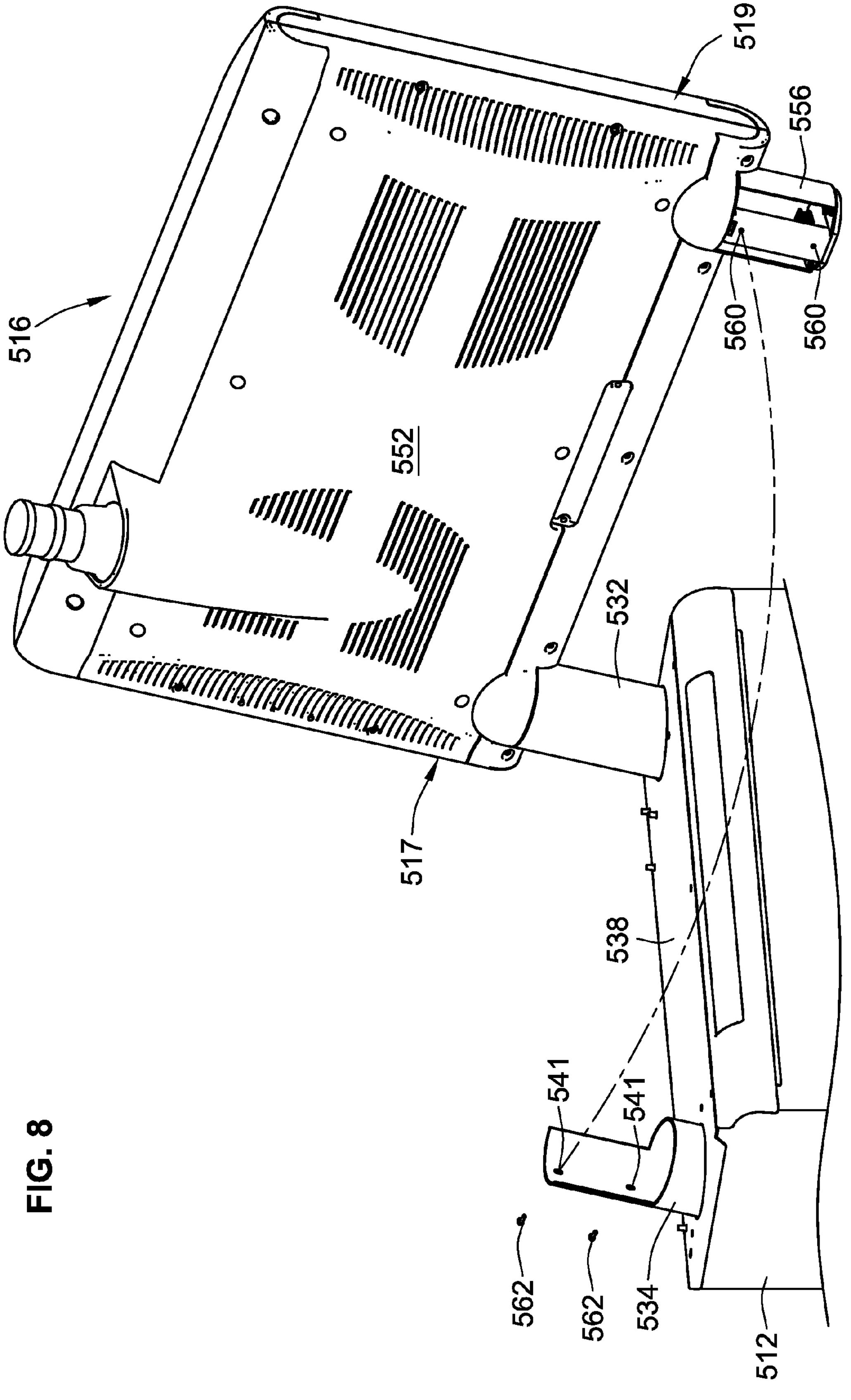
FIG. 8 is a perspective-view illustration of the display mounting assembly of FIG. 5 suspending the display device in a representative mounting/dismounting position.
Figure 9:
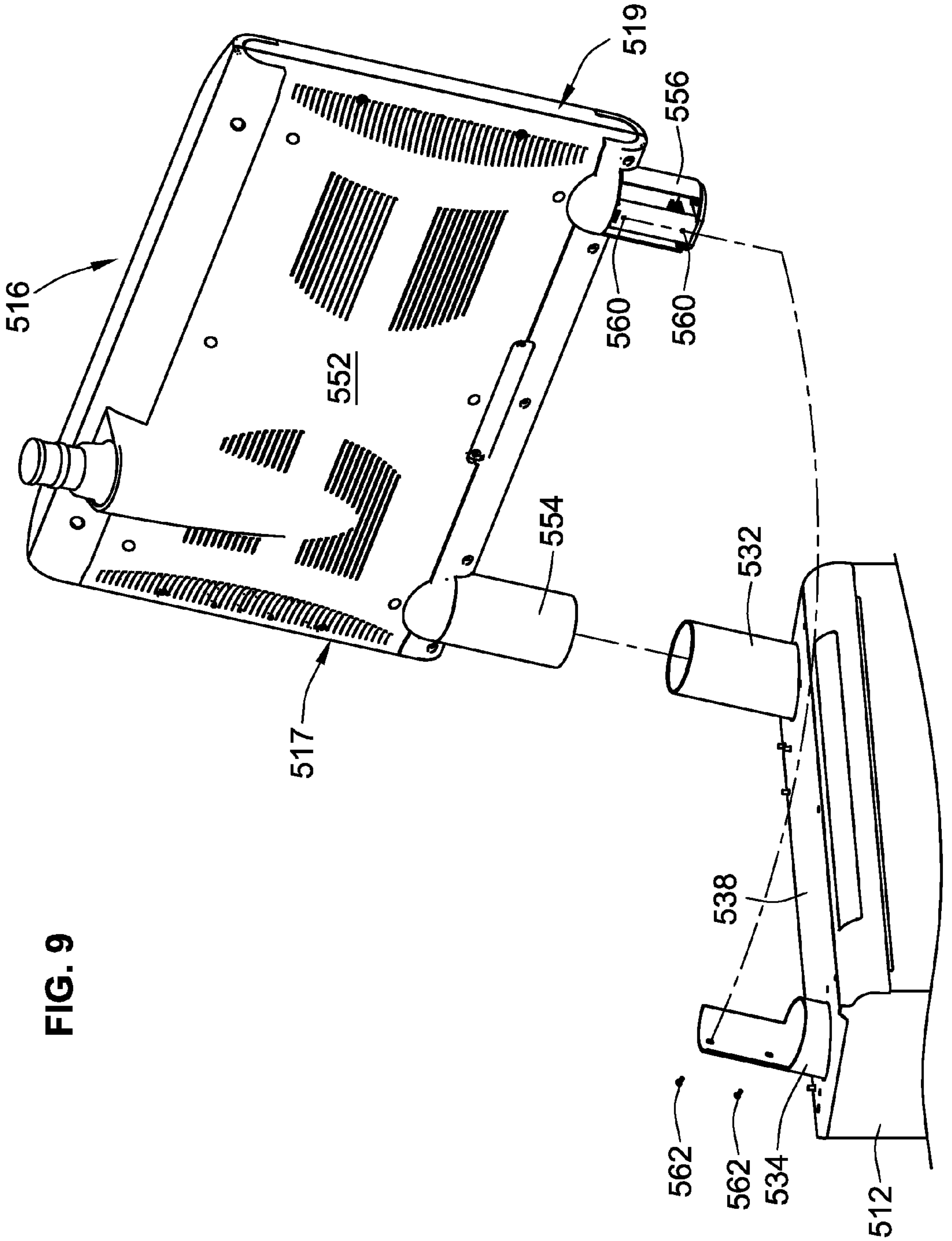
FIG. 9 is a perspective-view illustration of the display device and a portion of the display mounting assembly of FIG. 5 being removed from the representative gaming terminal.
Figure 13:
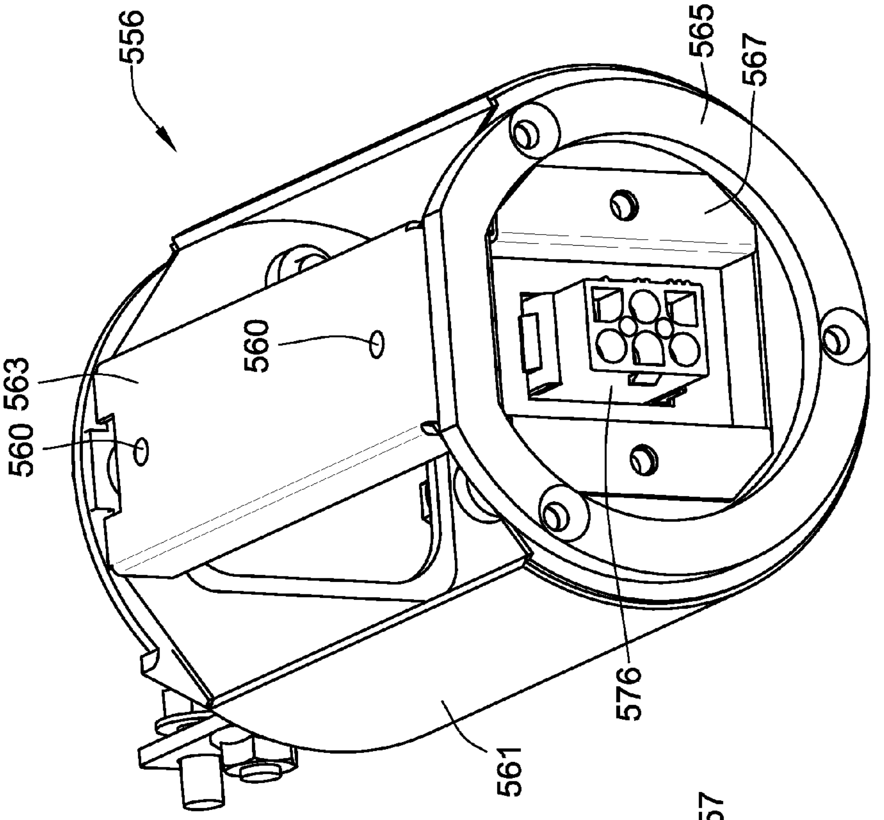
FIG. 13 is a perspective-view illustration of another exemplary mounting assembly swing pole configuration in accordance with aspects of the present disclosure.
Figure 12:
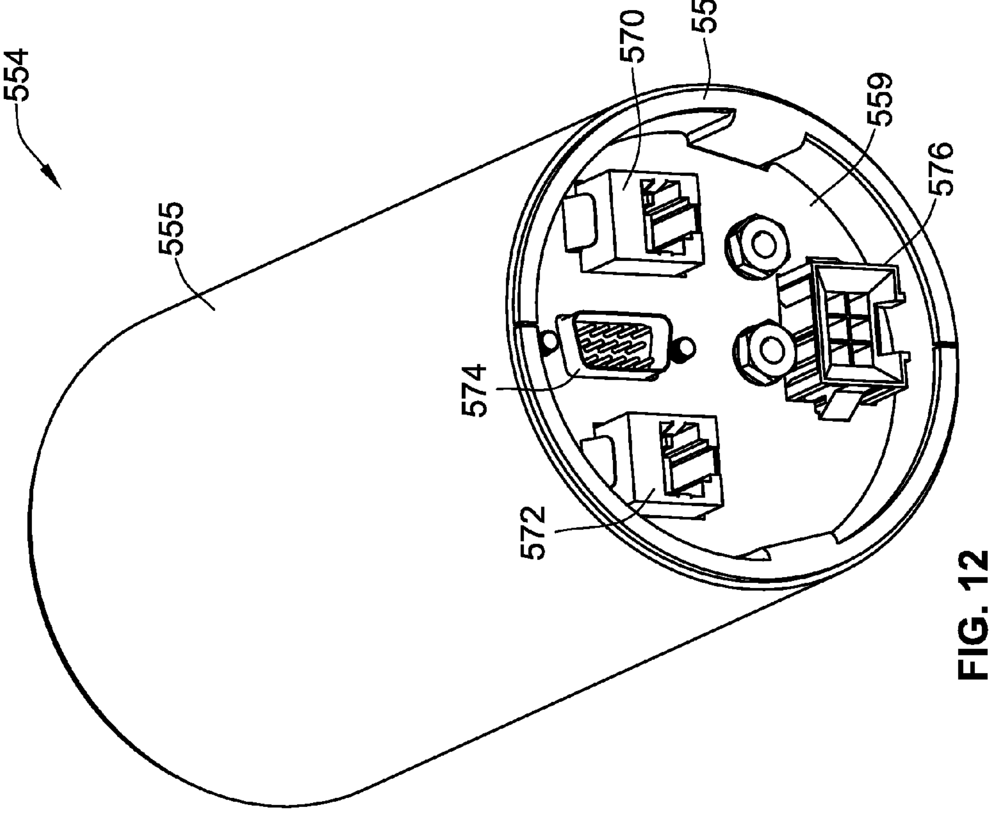
FIG. 12 is a perspective-view illustration of an exemplary mounting assembly swing pole configuration in accordance with aspects of the present disclosure.

A first generally cylindrical swing pole 554, the structure and functionality of which will be explained in further detail below during the discussion of FIG. 12, is attached to a lateral end of the cross-beam 542, extending from an opposing side thereof than the support beam 544. The first swing pole 554 is generally orthogonal to the cross-beam 542 and generally parallel to the support beam 544. In some embodiments, the support beam 544 extends downwardly through the center of first swing pole 554, structurally connecting the longitudinal ends of the first swing pole 554 together. A second generally cylindrical swing pole 556, the structure and functionality of which will be discussed in detail below during the description of FIG. 13, is attached to a lateral end of the support arm cross-beam 542 on the opposite end thereof than the first swing pole 554. The second swing pole 556 is generally parallel to the support beam 544 and first swing pole 554, extending generally orthogonally from the cross-beam 542. As seen in FIGS. 7-9, when the LCD panel 515, support arm 540, backing plate 546 and rear ventilation panel 552 are properly assembled, the first and second swing poles 554, 556 project out of the bottom of the display device 516. In so doing, the first and second swing poles 554, 556 attach to and protrude downwardly from the first and second lateral sides 517, 519, respectively, of the display device 516. As seen in FIG. 5, an optional guard plate 558 may also be provided, which nests on the crown of the gaming cabinet 512 underneath the display device 516, and sits in front of the sleeves 532, 534 and swing poles 554, 556 to protect and hide the same.

The first swing pole 554, which protrudes from the first lateral side 517 of the display device 516, is removably received by the first sleeve 532. In the illustrated embodiment, for example, the first swing pole 554 is received in the first sleeve 532 by aligning the bottom portion of the swing pole 554 with the receiving opening 533 at the upper longitudinal end of the first sleeve 532, and sliding the swing pole 554 down through the sleeve 532 in a telescoping manner. In a similar regard, the second swing pole 556, which protrudes from the second lateral side 519 of the display device 516, is removably received by the second sleeve 534. In contrast to the first sleeve 532 and first swing pole 554, to properly seat the second swing pole 556 within the second sleeve 534, the second swing pole 556 is traversed in a radial direction with respect to the second sleeve 534, and received in a cupping fashion through the receiving opening 535 in the side of the second support sleeve 534.

Referring to FIGS. 7-9, the support assembly 530 optimizes the ergonomics associated with mounting and dismounting the display device 516 by pivotably supporting the display device 516 such that one side thereof can be readily swung from over the top of the cabinet 512 to the front of the cabinet 512, and back, without requiring a technician to manage the bulk and weight of the display 516. As seen in FIG. 7, the mounting assembly 530 pivotably mounts the second display device 516 to a top portion of the cabinet 512. The mounting assembly 530, and thus the second display device 516, are selectively repositionable (e.g., can be swung) between a first “operational” position, illustrated for explanatory purposes in FIG. 7, and a second “dismountable” position, illustrated for explanatory purposes in FIG. 8. When in the first position, the entire display device 516 is positioned over a top portion of the cabinet 512, sitting generally upright and extending transversely with respect to the gaming terminal 510. While in this position, the second display device 516 can be rigidly attached to the cabinet 512. By way of non-limiting example, the second swing pole 556 can include threaded slots 560 (FIG. 8), each of which receives a complementary threaded fastener 562 (FIG. 8) that is fed through a corresponding hole 541 in the second support sleeve 534, thereby locking the display device 516 in the first position. In addition, when the second display device 516 is in the first position, it is functionally oriented for normal operation thereof. That is, the display device 516 is situated such that the LCD panel 515 is visible to players and operational for use during normal operation of the gaming terminal 510.

When the mounting assembly 530 and, thus, the second display device 516 are in the second position, as seen in FIG. 8, the second lateral side 519 of the display device 516 extends over the front of the cabinet 512 (i.e., the side with the primary display 514 and input devices 526). When so situated, the second display device 516 is generally perpendicular to the transverse plane (i.e., the width) of the gaming terminal cabinet 512. By swinging the display device 516 and mounting assembly 530 to the second position, the center of gravity of the second display device 516 is relocated to facilitate removal thereof from the cabinet 512. In an exemplary configuration, the first sleeve 532 carries the entire weight of the second display device 516 when swung from the first to the second position, and back. The L-shaped support arm 540 provides the necessary structural integrity for transmitting the weight of the display device 516 from the beams 542, 544, down through the first swing pole 554, and to the cabinet 512 via the first sleeve 532 and base plate 536. The first swing pole 554 regulates the bulk of the second display device 516 throughout the repositioning process. By shifting the center of gravity toward the technician while concomitantly controlling the bulk and weight of the display device 516, the ergonomics of mounting and removing the display device are improved by reducing the moment arm generated on the technician by the display device 516 during the mounting/dismounting process. In some embodiments, the second display device 516 is loosely attached to the cabinet 512 when in the second position to facilitate mounting or removal. That is, the first swing pole 554 of FIGS. 5-9 is concentrically nested inside the first sleeve 532 sans any fasteners or other attachment means that would severely impede swinging the display device 516 between the first position (FIG. 7) and the second position (FIG. 8), or seriously hinder lifting the display device 516 off of the cabinet 512 (FIG. 9).

Figure 10:
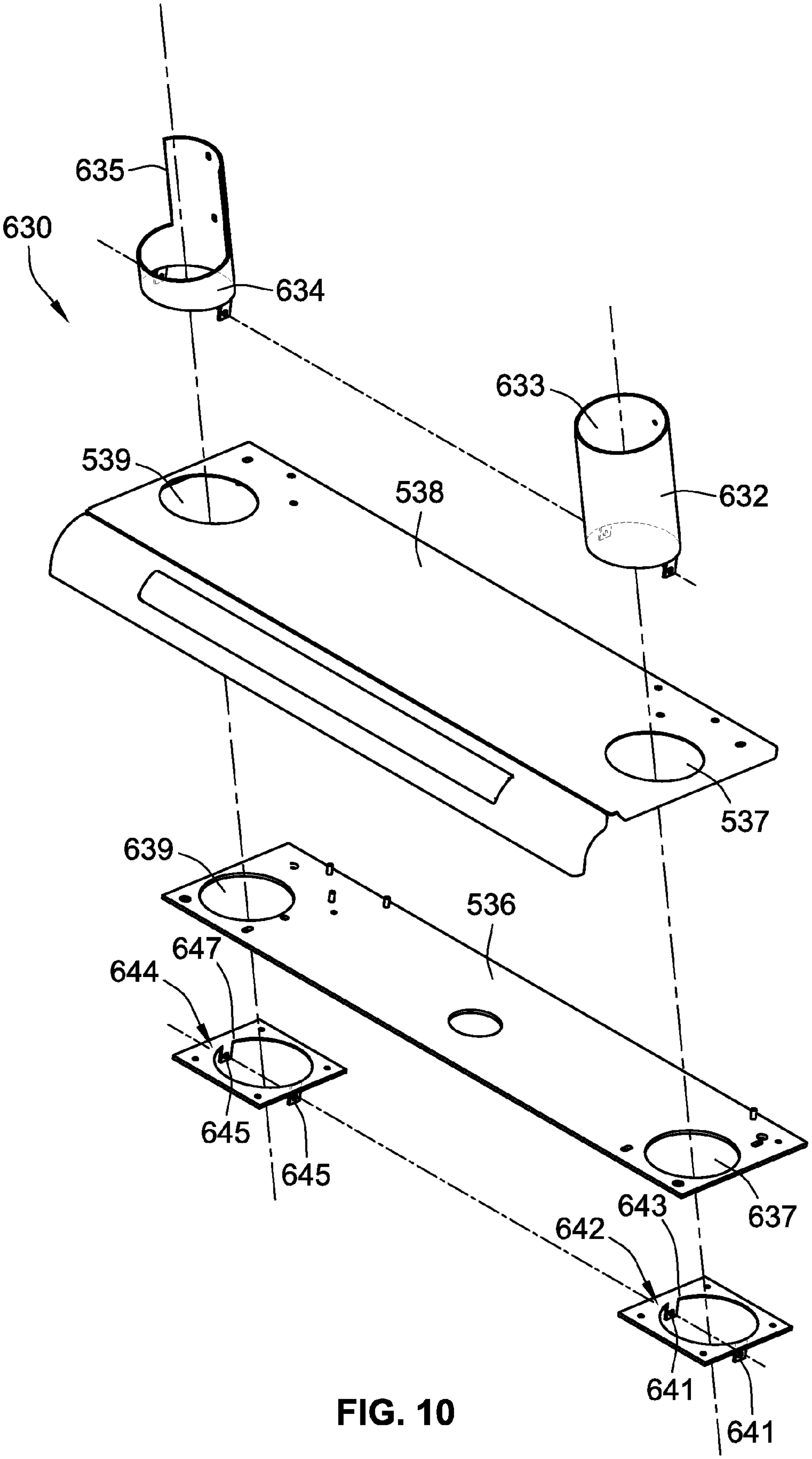
FIG. 10 is a partially exploded perspective-view illustration of an exemplary repositionable mounting assembly in accordance with aspects of the present disclosure.
Figure 11:
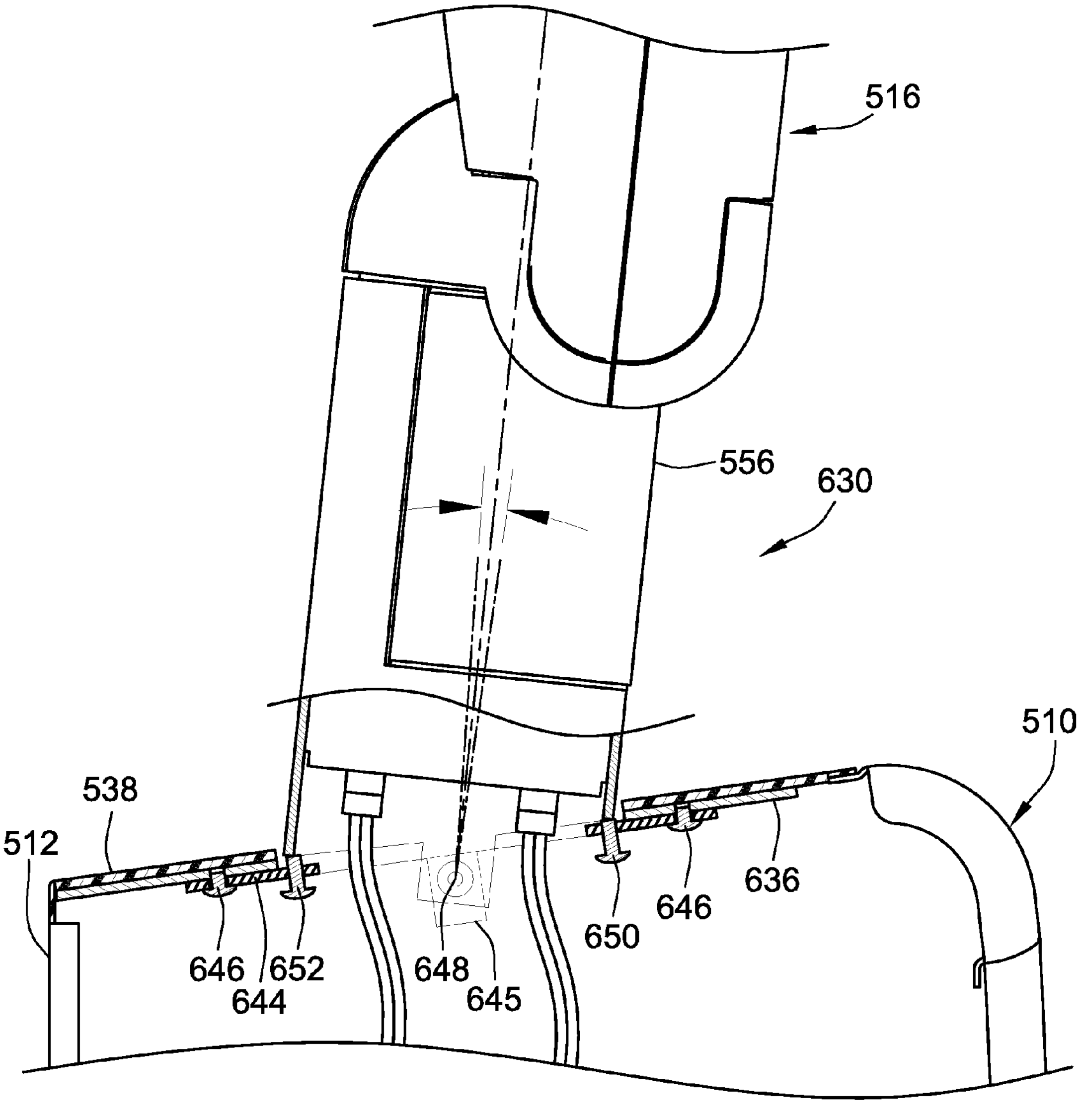
FIG. 11 is a partially cut away side-view illustration of the exemplary repositionable mounting assembly of FIG. 12.

Turning next to FIGS. 10 and 11, wherein like reference numbers refer to like components from FIGS. 5-9, a partially exploded perspective-view illustration of an exemplary repositionable mounting assembly, designated generally as 630, is shown in accordance with aspects of the present disclosure. Like the mounting assembly 530 in FIG. 5, the mounting assembly 630 (also referred to herein as "support assembly") of FIG. 10 includes two laterally offset attachment points, each of which removably attaches one of the laterally opposing sides 517, 519 of the display device 516 proximate the top of the cabinet 512. In the embodiment of FIG. 10, for example, first and second support sleeves 632 and 634, respectively, protrude upwardly through complementary holes 637, 639 in an elongated, generally planar base plate 636 and through the complementary holes 537, 539 in the trim panel 538. The base plate 636 can be integrated to the top of the gaming terminal cabinet 512 as described above with respect to the base plate 536 or, alternatively, in any other known fashion.

In the illustrated embodiment, both of the sleeves 632, 634 are elongated, generally cylindrical components. The first support sleeve 632 has a first receiving opening 633 through the upper longitudinal end thereof. In contrast, a portion of the cylindrical periphery of the second support sleeve 634 is cut away or otherwise removed to define a second receiving opening 635 through a lateral side of the second support sleeve 634. The first swing pole 554 can be received in the first sleeve 632 by aligning the bottom portion of the swing pole 554 with the receiving opening 633 at the upper longitudinal end of the first sleeve 632, and sliding the swing pole 554 down through the sleeve 632 in a telescoping manner. In contrast, the second swing pole 556 can be received within the second sleeve 634 by passing the swing pole 556 in a radial direction with respect to the second sleeve 634 through the receiving opening 635 in the side of the support sleeve 634 such that the swing pole 556 is received in a cupping fashion.

The first and second sleeves 632, 634 are pivotably mounted to the gaming terminal 510 and selectively repositionable with respect to the cabinet 512. FIGS. 10 and 11 provide an exemplary configuration where each of the sleeves 632, 634 is hinged at a bottom end thereof to the top portion of the cabinet 512. In particular, the support assembly 630 includes two pivot brackets 642 and 644, respectively, which rigidly attach (e.g., via screws 646 of FIG. 11) to the underside surface of the base plate 636. When properly attached, the base plate 636 is sandwiched between the brackets 642, 644 and trim panel 538, as seen in FIG. 11. The sleeves 632, 634 are passed through the complementary holes 537, 539, 637, 639 in the decorative trim panel 538 and the base plate 636, and hingedly attached to a respective one of the brackets 642, 644. By way of example, each pivot bracket 642, 644 includes a respective pair of flanges 641 and 645 that project generally orthogonally from a platform 643 and 647, respectively. The flanges 641, 645 include apertures through which are received one or more pivot pins 648 (FIG. 11). The pivot pins 648 pivotably attach the support sleeves 632, 634 to the pivot bracket 642, 644 such that the sleeves 632, 634 can tilt forward and backward with respect to the cabinet 512. A first set screw 650 passes through a forward edge of each bracket 642, 644, engaging a corresponding forward, bottom edge of a support sleeve 632, 634. In a similar regard, a second set screw 652 passes through a rearward edge of each bracket 642, 644, engaging a corresponding rearward, bottom edge of a support sleeve 632, 634. In accordance with this example, the first and second sleeves 632, 634 can be repositioned by rotating the set screws 650, 652, which in turn press against and move the corresponding forward and rearward, bottom edges of the support sleeves 632, 634. In some embodiments, the sleeves 632, 634 and, thus, the mounting assembly 630 can pivot between approximately 3-7 degrees. In some embodiments, the sleeves 632, 634 and, thus, the mounting assembly 630 can pivot at least 4 degrees.

FIG. 12 is a perspective-view illustration of the exemplary swing pole configuration 554 presented in FIG. 6. The swing pole 554 includes an elongated, generally cylindrical body 555 with open longitudinal ends. The bottom longitudinal end 557 of the cylindrical body 555 is generally closed off or capped by a socket plate 559, which supports a plurality of electrical connectors. In the illustrated embodiment, the plurality of electrical connectors includes four representative connectors: an emotive lighting RJ-45 connector 570, an emotive RJ-45 connector 572, a video (VGA) jack 574, and a Molex™ 6-pin tower connector 576. It should be recognized that the swing pole 554 can house greater or fewer than four electrical connectors, which can be similar to or vary from those connectors illustrated in FIG. 12. In some embodiments, the various electrical connectors housed by the swing pole 554 are accessible through the first sleeve (e.g., support sleeve 532 of FIG. 5 or support sleeve 632 of FIG. 10) when the first swing pole 554 is received therein. For example, when the first swing pole 554 is nested inside the first support sleeve 532, whether in the "operational" position of FIG. 7 or the "dismounting" position of FIG. 8, a technician can easily access the electrical connectors 570, 572, 574 and 576 by reaching into the cabinet 512 and up through the open bottom end of the support sleeve 532. In so doing, the second display device 516 can be quickly and effortlessly electrically connected to or disconnected from the gaming terminal 516. Also, due to the nature of the packaging, the various electrical connections will not hinder the repositioning of the display device 516. This simplifies and expedites the process of operatively mounting/dismounting the display device 516.

FIG. 13 is a perspective-view illustration of another exemplary swing pole configuration 556. The swing pole 556 includes an elongated, generally cylindrical body 561 with open longitudinal ends. A portion of the periphery of the cylindrical body 561 is cut away or otherwise removed and retrofitted with a U-shaped structural (FR) connector plate 563 that includes the threaded slots 560, which operate to lock the second display device 516 in the first position, as described above with respect to FIGS. 7-9. The bottom longitudinal end 565 of the cylindrical body 561 is partially closed off or capped by a socket plate 567, which supports one or more electrical connectors. In this particular embodiment, swing pole 556 houses a single electrical connector, which is a Molex™ DC-power 6-pin connector 576. It should be recognized that the swing pole 556 can house more than one electrical connector, which can be similar to or vary from the connector illustrated in FIG. 13. In some embodiments, the electrical connector(s) housed by the swing pole 556 are accessible through the second sleeve (e.g., support sleeve 534 of FIG. 6 or support sleeve 634 of FIG. 10) when the swing pole 556 is received therein. For example, when the second swing pole 556 is cupped inside the second support sleeve 534, for example, when the display device 516 is in the "operational" position of FIG. 7, the electrical connectors 576 can be easily accessed by a technician through the cabinet 512 such that the second display device 516 can be quickly and effortlessly electrically connected to or disconnected from the gaming terminal 516.

Figure 14:
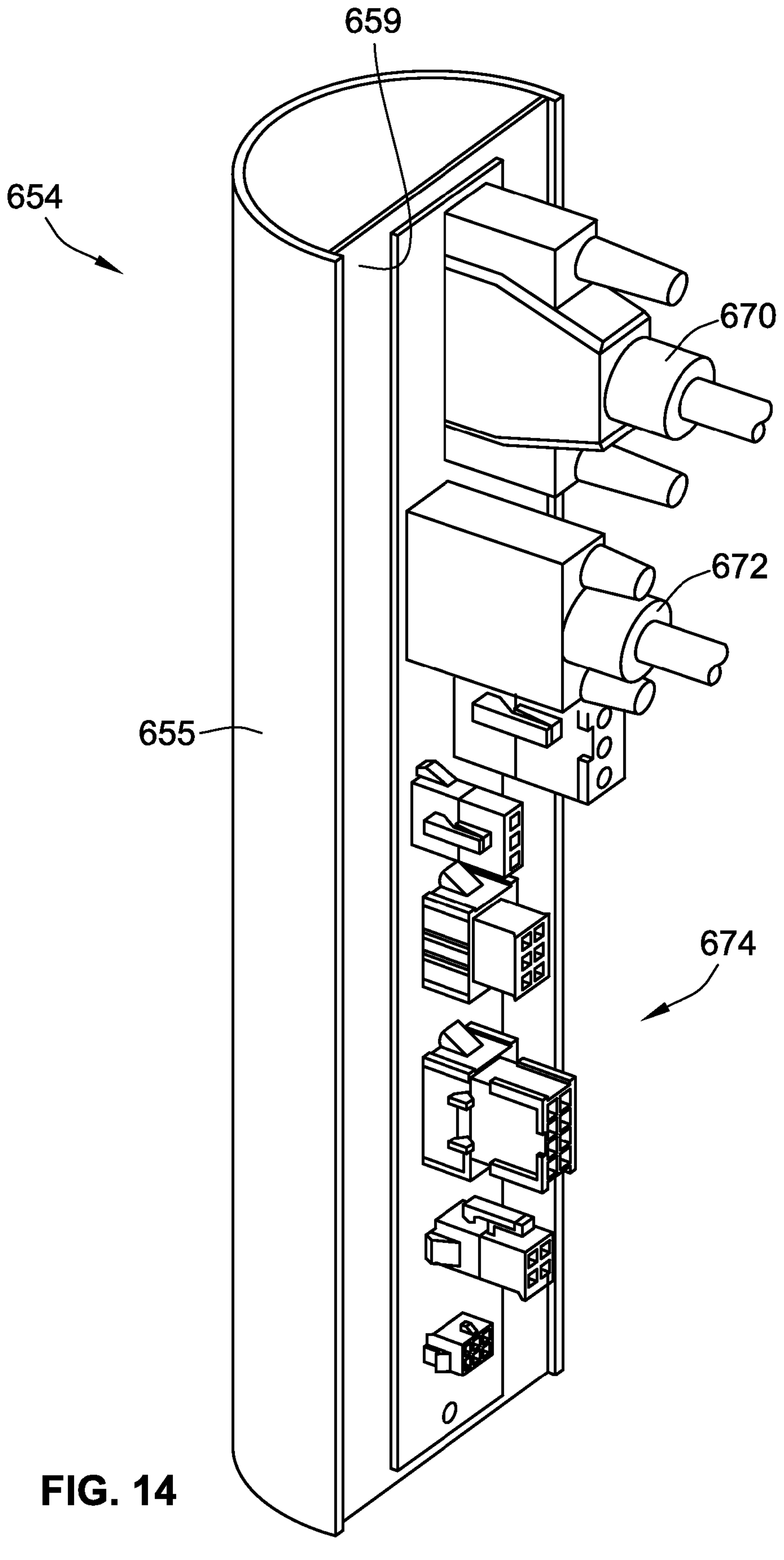
FIG. 14 is a perspective-view illustration of yet another exemplary mounting assembly swing pole configuration in accordance with aspects of the present disclosure.

FIG. 14 presents a perspective-view illustration of an alternative swing pole configuration 654 in accordance with aspects of the present disclosure. The swing pole 654 includes an elongated, half-cylinder body 655 with closed longitudinal ends. The flat side of the half-cylinder body 655 includes a socket plate 659, which supports a plurality of electrical connectors. In the illustrated embodiment, the plurality of electrical connectors includes eight representative connectors: a DVI digital monitor connector 670, a DVI-to-VGA connector 672, and an array of different Molex™ pin connectors, which are collectively designated as 674. Like the swing poles 554, 556 of FIGS. 12 and 13, the swing pole 654 can house greater or fewer than eight electrical connectors, which can be similar to or vary from those connectors illustrated in FIG. 14.

Also presented herein are improved methods of mounting and dismounting a display device, such as second display device 516, from a wagering game terminal, such as gaming terminal 510. In one exemplary implementation, a method of mounting a display device to a wagering game terminal is provided, which includes loosely seating the first lateral side of the display device in a support sleeve, such as first support sleeve 532, which protrudes upward from a top portion of the wagering game terminal. The first lateral side of the display device may include a swing pole, such as the first swing pole 554 presented in FIG. 6, which projects downwardly from a lower edge of the display device and is configured to nest inside the first support sleeve. As explained above, the swing pole can be received in the first sleeve by aligning a bottom portion of the swing pole with a receiving opening in the upper longitudinal end of the first sleeve, and sliding the swing pole down through the sleeve in a telescoping manner.

Thereafter, the lateral side of the display device on the opposite side of the first support sleeve is pivoted, swung, or otherwise moved from a forward-extending position, which is over a front portion of the terminal's cabinet, to a functional position, which is over the top of the cabinet. In some embodiments, the first sleeve carries the entire weight of the display device when swung back-and-forth between the forward-extending position and the functional position. The second lateral side of the display device is then attached to another support sleeve, such as second support sleeve 534, which protrudes upward from the top portion of the wagering game terminal. The second lateral side of the display device may include a second swing pole, such as the second swing pole 556 presented in FIG. 6, which projects downwardly from a lower edge thereof and is configured to nest inside the second support sleeve. As explained above, the second swing pole can be properly seated within the second support sleeve by traversing the second swing pole in a radial direction with respect to the second sleeve such that the second swing pole is received in a cupping fashion through a receiving opening in the side of the second support sleeve. The display device can then be rigidly fastened (e.g., via threaded fastener 562 received by the second swing pole 556 through the second sleeve 534) in the functional position over the top portion of the cabinet. At this juncture, the second display device can also be electrically coupled to the gaming terminal, for example, as described above with respect to FIGS. 12 and 13. In other embodiments, the display device can be dismounted from the wagering game terminal by performing the foregoing steps in the reverse order. In some embodiments, the method includes at least those steps enumerated above. It is also within the scope and spirit of the present invention to omit steps, include additional steps, and/or modify the order presented above.

While many preferred embodiments and best modes for carrying out the present invention have been described in detail above, those familiar with the art to which this invention relates will recognize various alternative designs and embodiments for practicing the invention within the scope of the appended claims.

What is claimed is:

1. A gaming terminal for playing a wagering game, the gaming terminal comprising:
- an input device configured to receive a wager to play the wagering game;
- a display device configured to display information related to the wagering game, the display device having first and second laterally opposing sides;
- a cabinet; and
- a mounting assembly affixing the display device proximate to a top of the cabinet, the mounting assembly pivotably supporting the display device such that the second side of the display device can be selectively swung from a first position over the top of the cabinet, whereat the display device is rigidly securable to the cabinet, to a second position over a front of the cabinet, whereat the display device is unsecured to and readily removable from the cabinet.

2. The gaming terminal of claim 1, wherein the mounting assembly includes first and second attachment points each attaching one of the first and second laterally opposing sides of the display device proximate to the top of the cabinet.

3. The gaming terminal of claim 2, wherein the first attachment point comprises a first sleeve configured to receive a first swing pole protruding from the first side of the display device, and the second attachment point comprises a second sleeve configured to receive a second swing pole protruding from the second side of the display device.

4. The gaming terminal of claim 3, wherein the first sleeve has a first receiving opening through a longitudinal end thereof, the first swing pole being received telescopically through the first receiving opening of the first sleeve.

5. The gaming terminal of claim 3, wherein the second sleeve has a second receiving opening through a lateral side thereof, the second swing pole being received transversely through the second receiving opening of the second sleeve.

6. The gaming terminal of claim 3, wherein the first sleeve carries a substantial portion of the weight of the display device when swung between the first and second positions.

7. The gaming terminal of claim 6, wherein the mounting assembly further comprises an L-shaped support arm attached to the display device, the L-shaped support arm transmitting the substantial portion of the weight of the display device to the first sleeve when the display device is swung between the first and second positions.

8. The gaming terminal of claim 7, wherein the mounting assembly further comprises a backing plate mounting the display device to the L-shaped support arm.

9. The gaming terminal of claim 3, wherein the mounting assembly includes a base plate attached to the top of the cabinet, the first and second sleeves being rigidly attached to and protruding upwardly from the base plate.

10. The gaming terminal of claim 3, wherein the first and second sleeves are pivotably attached to a top portion of the cabinet, the first and second sleeves being selectively repositionable with respect to the cabinet.

11. The gaming terminal of claim 10, wherein the mounting assembly further comprises first and second pivot brackets, each of the pivot brackets including a pair of flanges through which are received one or more pivot pins which pivotably attach a respective one of the sleeves to the top portion of the cabinet.

12. The gaming terminal of claim 3, wherein the second swing pole is configured to rigidly attach to the second sleeve and thereby lock the display device in the first position.

13. The gaming terminal of claim 3, wherein the first swing pole includes a plurality of electrical connectors, the electrical connectors being accessible through the first sleeve when the first swing pole is received in the first sleeve.

14. A gaming system comprising:

at least one input device;

at least one processor;

at least one memory;

at least one display;

a cabinet; and a mounting assembly affixing the at least one display to a top of the cabinet, the mounting assembly including first and second attachment points each attaching a respective one of first and second laterally opposing sides of the at least one display to the cabinet, the first attachment point pivotably attaching the first lateral side of the at least one display to the top of the cabinet such that the second lateral side of the at least one display can be selectively swung from a first position over the top of the cabinet to a second position over a front of the cabinet where the at least one display is removable from the top of the cabinet.

15. The gaming system of claim 14, wherein the at least one display is rigidly attached to the cabinet when in the first position, and wherein the at least one display is loosely attached to the cabinet when in the second position.

16. A gaming machine for displaying an outcome of a wagering game, the outcome being randomly determined from a plurality of wagering game outcomes, the gaming machine comprising:

an input device configured to receive a wager to play the wagering game;

a cabinet;

first and second display devices mounted to the cabinet, at least one of the first and second display devices being configured to display the wagering game outcome; and a mounting assembly pivotably mounting the second display device to a top of the cabinet, the mounting assembly being repositionable between a first position, whereat the second display device is rigidly securable to the cabinet and functionally oriented for normal operation thereof, and a second position, whereat a center of gravity of the second display device is relocated and the second display device is unsecured to the cabinet to facilitate removal thereof from the cabinet.

17. The gaming machine of claim 16, wherein the second display device is positioned over a top portion of the cabinet when the mounting assembly is in first position, and extends over a front portion of the cabinet when the mounting assembly is in the second position.

18. The gaming machine of claim 16, wherein the first and second positions are generally perpendicular to one another.

19. A gaming terminal for displaying randomly determined outcomes of a wagering game, the gaming terminal comprising:

an input device a cabinet;

a display device; and a mounting assembly removably mounting the display device to the top of the cabinet, the mounting assembly including:

a first swing pole protruding from a first lateral side of the display device;

a second swing pole protruding from a second lateral side of the display device;

a first sleeve protruding upwardly from the top of the cabinet, the first sleeve removably receiving therein the first swing pole; and a second sleeve protruding upwardly from the top of the cabinet, the second sleeve removably receiving therein the second swing pole, wherein the first sleeve pivotably supports the display device such that the second lateral side of the display device can be selectively swung from a first position over the top of the cabinet to a second position over a front of the cabinet where the display device is removable from the cabinet.

20. The gaming terminal of claim 19, wherein the mounting assembly further comprises an L-shaped support arm attached to the display device and transmitting the weight of the display device to the first sleeve when the display device is swung between the first and second positions.

21. The gaming terminal of claim 20, wherein the L-shaped support arm is configured to attach the first and second swing poles to the first and second lateral sides of the display device, respectively.

22. The gaming terminal of claim 20, wherein the mounting assembly further comprises a backing plate mounting the display device to the L-shaped support arm.

23. The gaming terminal of claim 19, wherein the mounting assembly further comprises a base plate attached to the top of the cabinet, the first and second sleeves being rigidly attached to and protruding upwardly from the base plate.

24. The gaming terminal of claim 19, wherein the first sleeve has a first receiving opening through a longitudinal end thereof, the first swing pole being received telescopically through the first receiving opening, and wherein the second sleeve has a second receiving opening through a lateral side thereof, the second swing pole being received transversely through the second receiving opening.

* * * * *